Nov. 4, 1952

G. HEPP 2,617,019

SILENCING NETWORK

Filed July 15, 1947

3 Sheets-Sheet 1

INVENTOR
GERARD HEPP
BY Fred M Vogel
AGENT

INVENTOR
GERARD HEPP
BY Fred M Vogel
AGENT

Nov. 4, 1952 G. HEPP 2,617,019

SILENCING NETWORK

Filed July 15, 1947 3 Sheets-Sheet 3

INVENTOR
GERARD HEPP
BY
AGENT

Patented Nov. 4, 1952 2,617,019

UNITED STATES PATENT OFFICE 2,617,019

SILENCING NETWORK

Gerard Hepp, Eindhoven, Netherlands, assignor to Hartford National Bank and Trust Company, Hartford, Conn., as trustee Application July 15, 1947, Serial No. 761,046
In the Netherlands July 17, 1946

6 Claims. (Cl. 250—20)

Figures 1, 1A:
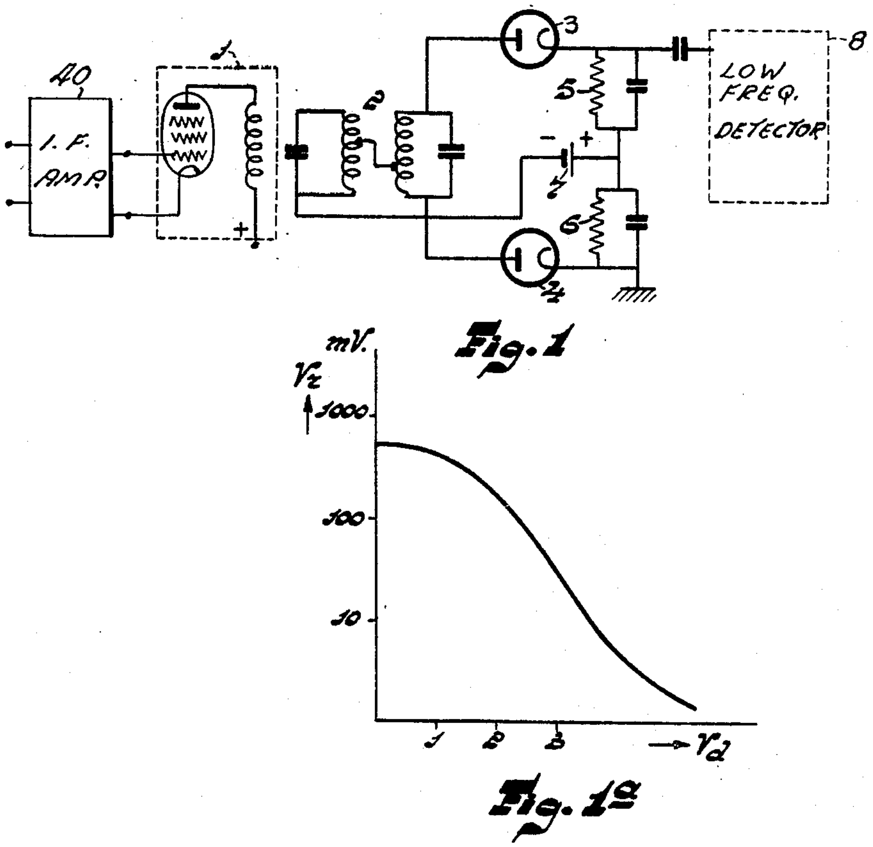

As is well-known, very strong noise occurs in tuning a receiver for use on frequency-modulated oscillations if no signal is received. This is due to the fact that receivers of frequency-modulated oscillations naturally pass a wide band of frequencies so that the noise voltage produced in the receiver and proportional to the passed bandwidth has a particularly high value. In addition, in the absence of a signal, the noise voltages are amplified with the maximum amplification factor as a result of the automatic volume control.

In order that these noise interferences may be rendered inactive, it is known to block the receiver when the latter is tuned in the region between two transmitters, in which no signal is received, or tuned to a transmitter which is not in operation. This tuning is referred to as "silent tuning."

In a circuit of known form this blocking is effected by means of a control voltage which is derived from the voltages set up across the two output resistances of the two diodes of an ordinary frequency detector. This control voltage is used to block the portion of the receiver following the frequency detector.

In a further known circuit provision is made of an auxiliary tube which is made conductive if no signal is received, whereafter the limiter is rendered voltageless by means of a relay included in the anode circuit of this tube.

For receivers of amplitude-modulated oscillations circuits are known in which the low-frequency portion comprises means by which weak signals are suppressed. For example, the tubes of the push-pull output stage are adjusted slightly below their cut-off points.

It is also known in such receivers to effect silent tuning by providing that the amplitude detector has a determined threshold voltage.

In the frequency detector of receivers of frequency-modulated oscillations such threshold voltage has not been used hitherto since in this case distortion would result.

In order to obviate the disadvantage of distortion in an amplitude detector having a threshold voltage, a circuit is known by which the said threshold voltage is decreased in accordance with the amplitude of the incoming signal. Such a method is expensive on account of the additional tubes that are required to obtain this effect whilst avoiding at the same time self-oscillation of the circuit.

The present invention underlies recognition of the fact that the danger of distortion does not prevail in receivers for use on frequency-modulated oscillations if the latter are so proportioned that, if no provision is made of means for silent tuning, the amplitude of the output voltage of the limiter swung out completely is great with respect to the amplitude in the absence of a signal, which implies that the effect of the automatic volume control upon the stages preceding the limiter must be comparatively small.

According to the invention, silent tuning in such a receiving circuit for frequency-modulated oscillations is effected in that a voltage derived from a constant source of supply is active in the circuit of one or more of the thermionic tubes of the stages in such manner that this tube or tubes is or are blocked if the amplitude of the incoming signal remains below a determined minimum value exceeding the noise level.

When taking the steps according to the invention there is no danger of excessive distortion. Taking, by way of example, an ordinary frequency detector comprising two detector diodes fed with a signal voltage of 12 volts which is derived from the limiter, it appears to be possible for the noise in the circuit of the detector diodes to be suppressed completely with the aid of a threshold voltage of 3 volts only.

In the event of a comparatively weak transmitter being received with which the limiter, instead of being swung out completely, supplies an output voltage of, say, 7 volts only, the threshold voltage will lead to distortion. However, the quality of the reproduction in this case is already unsatisfactory since limitation of any amplitude modulation no longer takes place.

However, the distortion occurring due to the threshold voltage may also be suppressed completely if, according to a further elaboration of the inventive idea, the threshold voltage is constituted by the difference between the voltage of the said constant source of supply and a voltage derived from the output circuit of the limiter.

Taking this measure in a receiver of a type different from that referred to here would lead to unfavourable results since, if the output voltage of the limiter swung out completely has no high value with respect to that in the absence of a signal, the phenomenon occurs that, with transmitters which are so weak that the limiter is not swung out completely, the amplitude modulation of the incoming signal alternately causes the receiving circuit to open and close.

The inventive idea will now be elaborated more fully for two cases.

The first case concerns its application to a frequency detector in which the frequency-modulated oscillation that is to be demodulated is supplied to a frequency detector of the conventional type comprising a frequency-dependent network in which the oscillation is converted into an amplitude-modulated oscillation and subsequently supplied to, for example, two rectifiers connected in push pull.

The control voltage is supplied to the rectifiers in such manner that the latter acquire a determined threshold sensitivity exceeding the noise level. When the amplitude of the incoming signal increases, means may be provided by which the threshold voltage is decreased so that the rectifiers may be operated in the most advantageous portion of their characteristic curves upon reception of desired signals.

The second case concerns the application to a limiter. In this case, as before, a biassing potential is applied such that no anode current flows in the limiter tube for noise signals. Upon reception of a desired signal having an amplitude greater than that of the said biassing potential, an anode current will flow. Now, the circuit is such that the anode current causes a decrease of the said biassing potential so that the limiter suddenly falls within its proper working range.

The two applications of the inventive idea will be explained more fully with reference to the accompanying drawing.

In the circuit shown in Fig. 1 the frequency-modulated signal produced in the output circuit of a limiter 1 is supplied to a frequency detector comprising a network 2, two rectifiers 3 and 4 and output resistances 5 and 6.

The circuit of the two rectifiers comprises a source of voltage 7 supplying a threshold voltage which prevents the noise voltage occurring in the absence of a signal from reaching the low-frequency detector 8 following the frequency detector.

In Figure 1*a* the noise voltage $V_r$ set up at the output terminals of the receiver is plotted (in a logarithmic scale) as a function of the threshold voltage $V_d$, supplied by the source 7. A voltage of only a few volts appears to be sufficient for suppression of the noise.

Figure 2:
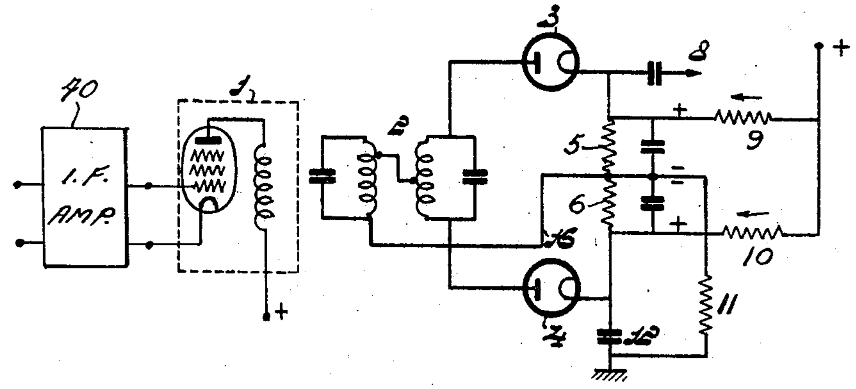

In Figure 2 in which reference numerals are used identical with those in Figure 1, a threshold voltage is set up across the resistances 5 and 6 since the latter are connected via resistances 9, 10 and 11 to the positive source of supply and earth respectively, a condenser 12 serving as a blocking condenser.

Although the threshold voltage has a comparatively low value, the danger is involved that the rectifiers are operated in a non-linear portion of their characteristic curve.

Figures 3, 3A, 4:
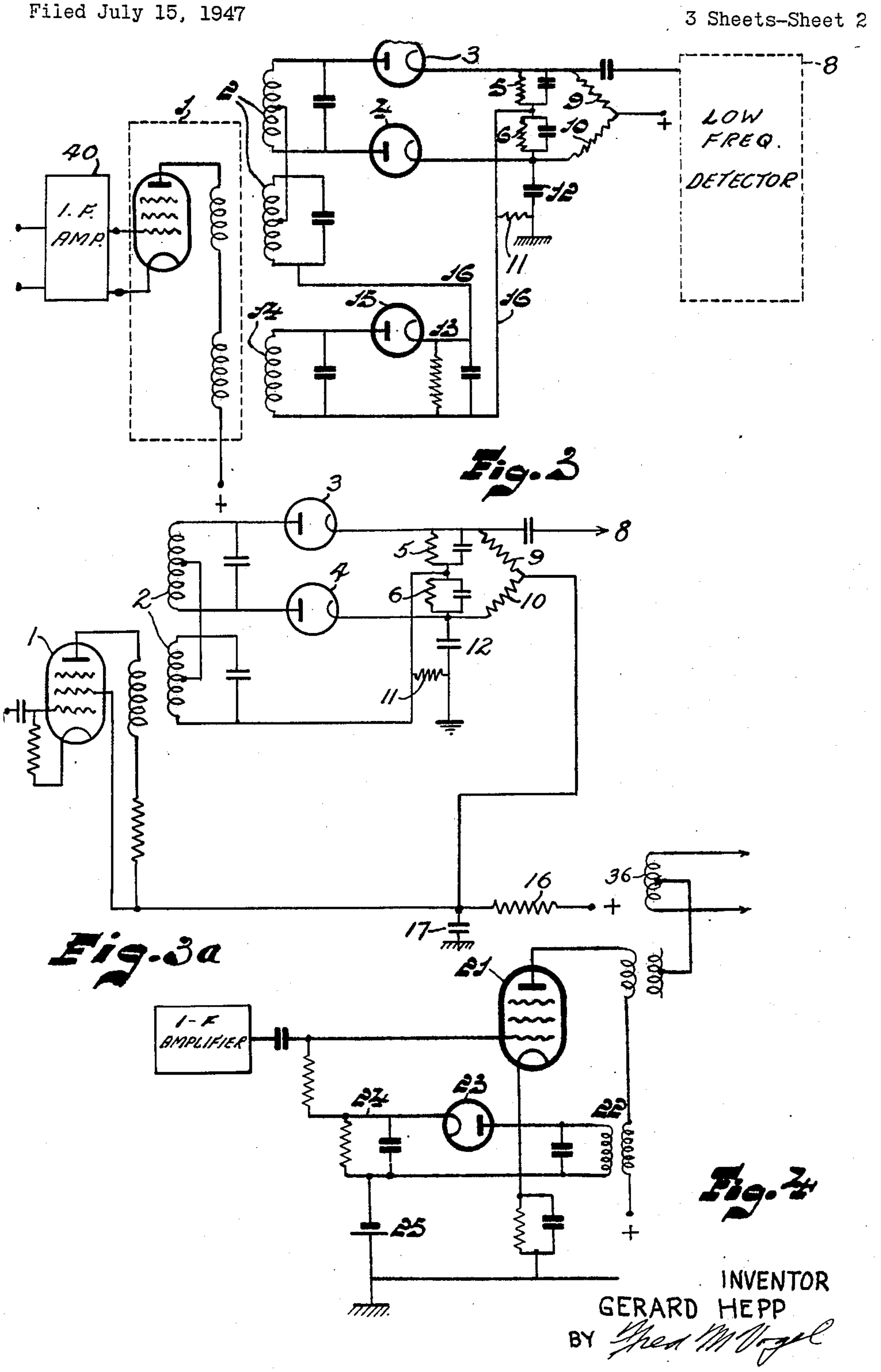

Figure 3 shows a circuit of the kind in which the threshold voltage decreases as the amplitude of the incoming signal increases.

The circuit elements 1 to 12 are identical with those shown in Figure 2. The connecting lead 16 includes a smoothing filter 13 between the centre of the smoothing filters and the network 2, across which filter a voltage is set up proportional to the output voltage of the limiter 1, which neutralises the threshold voltage of the rectifiers 3 and 4, since the output circuit of the limiter includes a transformer 14, the secondary winding of which is connected to a rectifier 15 and the smoothing filter 13. It is also possible, as shown in Figure 3*a*, to cause the threshold voltage to decrease with increasing amplitude of the incoming signal, without the additional rectifier 15 shown in Figure 3 being required, by supplying the limiter, as is already desirable in certain circuits, via a resistance 16 of comparatively high value and a smoothing condenser 17. The junction point of the resistances 9 and 10 is connected to the end of resistance 16 remote from the source of supply. If a signal is received, the limiter is current-conveying and brings about a voltage loss across resistance 16 such as to neutralise substantially the threshold voltage of the rectifiers 3 and 4.

The elements 9, 10 and 14 are preferably so proportioned that the rectifiers operate exactly in the most advantageous portions of their characteristic curve when the limiter is swung out completely.

In the two circuits the optimum adjustment is obtained without any danger of self-oscillation. This is due to the fact that the limiter automatically supplies an output voltage rising up to a determined final value.

Figure 4 shows a circuit in which the inventive idea is applied to a limiter. The anode circuit of a limiter tube 21 comprises the primary winding of a transformer 22, the secondary winding of which exhibits a voltage rectified by a diode 23 and an output resistance 24. An output transformer arrangement 36 to feed into a cascaded detector is indicated merely schematically for simplicity.

The grid circuit of the limiter tube comprises a constant source of supply 25, in series with the said output resistance 24. In the absence of a signal the grid of the limiter tube exhibits a negative bias equal to the voltage of the source 25. When a signal occurs exceeding this negative bias, the anode current starts to flow and a voltage is set up across resistance 24 by which the negative bias is decreased. The proportioning is preferably such that, with a normally operating limiter, the adjustment of the direct voltage set up at the grid corresponds to the optimum working point of the limiter tube.

Figure 5:
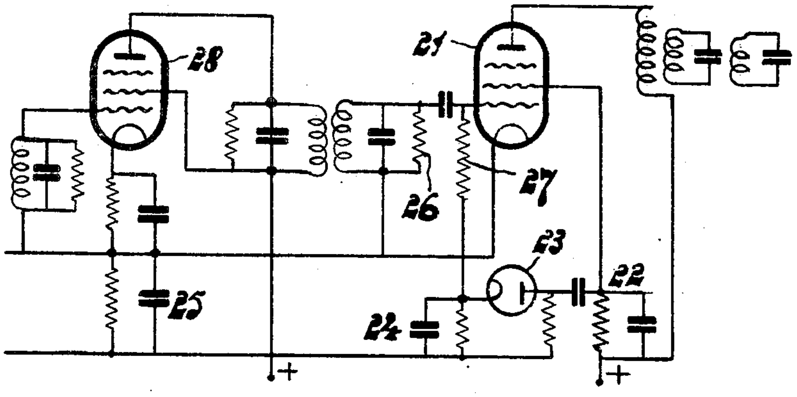

Figure 5 shows a similar circuit in which the voltage supplied in Figure 4 by the source 25 is obtained by providing a resistance and a decoupling condenser 25 in the cathode circuit of, for example, the intermediate-frequency amplifying tube 28 preceding the limiter stage.

Figure 5A:
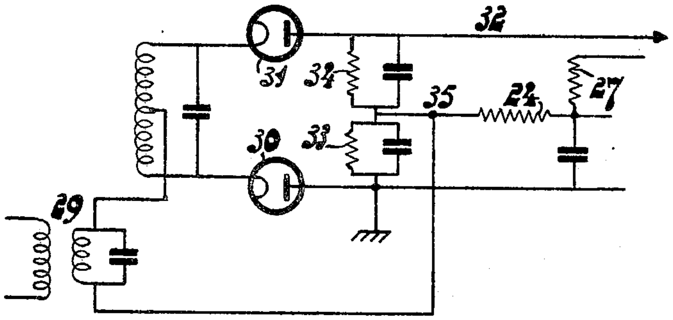

The diode 23, the circuit 22 and the output resistance 24 may be dispensed with if the voltage across resistance 24 in Fig. 5, which varies with the strength of the signal, is replaced by a voltage derived from the frequency detector shown in Figure 5*a*. The signal to be rectified is supplied via a coupling transformer 24 and derived from the output 32 of diodes 30 and 31 and output resistances 33 and 34. Upon reception of a signal the point 35 exhibits a positive voltage which is fed via smoothing filter 24 and resistance 27 to the grid of the limiter tube 21.

The present invention is not restricted to the examples given hereinbefore. Thus, it is also possible to apply a threshold voltage to an intermediate-frequency amplifier or to the mixing tube, which voltage is decreased with increasing signal strength in accordance with the voltage derived from the limiter.

Furthermore, the limiter may be constituted by a synchronised oscillator having a biassing potential such that synchonisation cannot be effected by the noise voltages only.

What I claim is:

1. In a radio receiver for frequency modulated signals; a silencing circuit arrangement comprising a limiting stage having a predetermined limiting value, means to apply the signal as an input to said limiting stage, means to apply a direct current biasing potential to said limiter stage to render said stage inoperative at signal levels below a given value, rectifying means to rectify the output of said limiter stage to derive therefrom a rectified voltage proportional to said output, and means to apply said rectified voltage to said limiter stage in a polarity counteracting said biasing potential.

2. In a radio receiver for frequency modulated signals; a silencing circuit arrangement comprising a limiting stage having a predetermined limiting value and including an electron discharge tube having cathode, grid and anode electrodes defining a cathode-anode circuit, means to apply the signal as an input to the grid of said tube, means to apply a direct current biasing potential to the grid of said tube to render the tube non-conducting for signal input levels below a given value, rectifying means to rectify the output of said tube to derive therefrom a rectified voltage proportional to the output of said tube, and means to apply said rectified voltage to the grid of said tube in a polarity counteracting said biasing potential.

3. In a radio receiver for frequency modulated signals; a silencing circuit arrangement comprising an intermediate frequency amplifier stage including a first electron discharge tube having cathode, grid and anode electrodes, a limiting stage having a predetermined limiting value and including a second electron discharge tube having cathode, grid and anode electrodes, means to apply the signal as an input to the grid of said first tube, means to couple the anode of said first tube to the grid of said second tube, a resistance-capacitance network included in the cathode-anode circuit of said first tube, means to derive a direct current biasing potential from said network and to apply said potential to the grid of said second tube to render said second tube non-conducting for signal input levels below a given value, rectifying means to rectify the output of said second tube to derive therefrom a rectified voltage proportional to the output of said second tube, and means to apply said voltage to the grid of said second tube in a polarity counteracting said biasing potential.

4. In a radio receiver for frequency modulated signals and provided with an intermediate frequency stage, a limiting stage and a frequency demodulator stage, with means to supply the signal from the intermediate frequency stage through said limiter stage to said demodulator stage; the combination therewith, to provide a silencing circuit arrangement, of means to apply a direct current biasing potential to one of said stages to render said stage inoperative at input levels below a given value, rectifying means to rectify the output of said limiter stage to derive therefrom a rectified voltage proportional to said output, and means to apply said rectified voltage to said inoperative stage in a polarity counteracting said biasing potential.

5. In a radio receiver for frequency modulated signals; a silencing circuit arrangement, as set forth in claim 4, wherein said frequency demodulator stage is constituted by a frequency discriminator and wherein said direct current biasing potential is applied to said frequency discriminator to render said demodulator stage inoperative at input levels below said given value.

6. In a radio receiver for frequency modulated signals: a silencing circuit arrangement, as set forth in claim 5, wherein said frequency discriminator includes first and second diodes coupled together in push-pull relationship, the output of said limiter being applied to the anodes of said diodes, said direct-current potential being applied in a positive polarity to the cathodes of the diodes to render said diodes non-conductive for signal input values below said given level, said rectified voltage being applied to said cathodes in a polarity counteracting said biasing potential.

GERARD HEPP.

REFERENCES CITED

The following references are of record in the file of this patent:

UNITED STATES PATENTS

| Number | Name | Date |
|---|---|---|
| 1,859,565 | Kieth | May 24, 1932 |
| 2,159,753 | Steimel | May 23, 1939 |
| 2,197,516 | Case | Apr. 16, 1940 |
| 2,230,578 | Tittle | Feb. 4, 1941 |
| 2,279,275 | Kamenarovic | Apr. 7, 1942 |
| 2,282,101 | Tunick | May 5, 1942 |
| 2,316,851 | Foster | Apr. 20, 1943 |
| 2,316,902 | Trevor | Apr. 20, 1943 |
| 2,344,731 | Rankin | Mar. 21, 1944 |
| 2,391,130 | Chatterjea | Dec. 18, 1945 |
| 2,447,564 | Carnahan | Aug. 24, 1948 |